A. ZERBAN.
Sampling Colors for Patterns.

No. 206,064. Patented July 16, 1878.

WITNESSES:
Francis McArdle
C. Sedgwick

INVENTOR:
A. Zerban
BY
ATTORNEYS.

UNITED STATES PATENT OFFICE.

ANDREW ZERBAN, OF NEW YORK, N. Y.

IMPROVEMENT IN SAMPLING COLORS FOR PATTERNS.

Specification forming part of Letters Patent No. 206,064, dated July 16, 1878; application filed March 20, 1878.

*To all whom it may concern:*

Be it known that I, ANDREW ZERBAN, of the city, county, and State of New York, have invented a new and Improved Mode of Matching Colors, of which the following is a specification:

My invention consists in the mode of making up combinations of colors for patterns of woven and printed goods, which will be hereinafter described.

Figure 1:
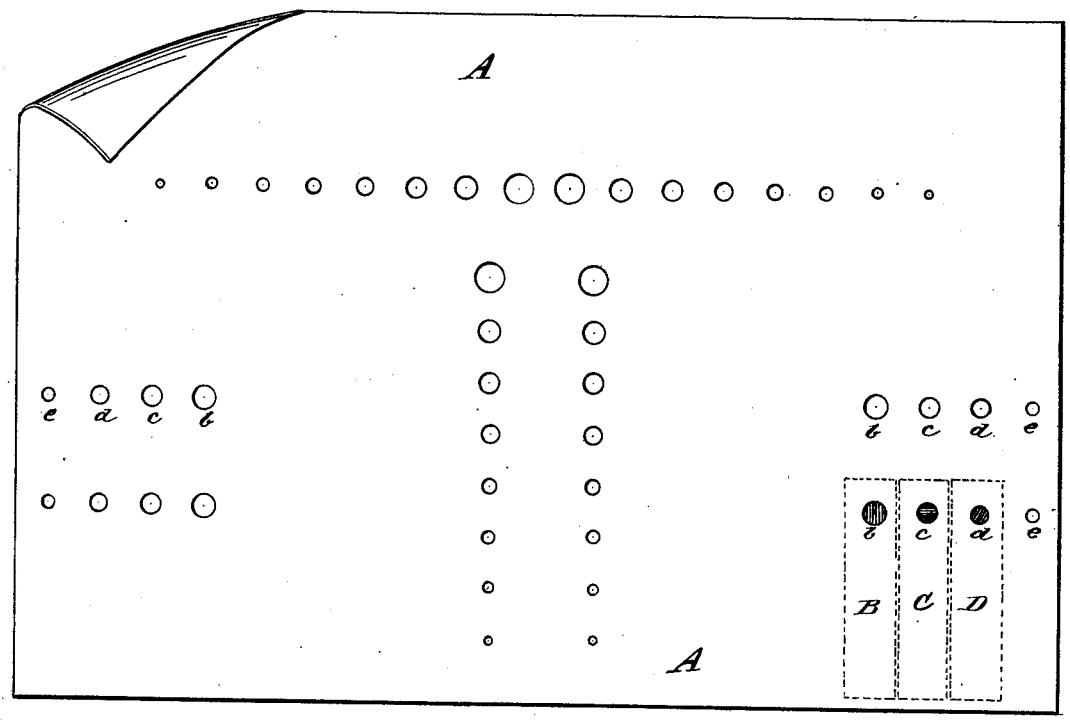
Figure 2:
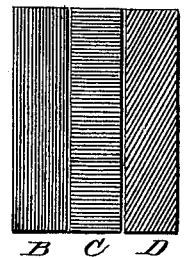

In the accompanying drawings, Figure 1 represents a plan view of a perforated cloth of the desired ground color of the goods. Fig. 2 is a plan view of three of the different-colored samples for selection.

Similar letters of reference indicate corresponding parts.

In making up combinations of colors for patterns of woven or printed goods it often happens that even the most pleasing combinations of carefully-selected shades of colors lose their effect when woven into the cloth or printed upon the goods, by want of harmony of shades and tasteful contrast with the color of the ground upon which they appear, and the placing side by side of a selected combination of colored samples and a sample of the ground color does not enable the observer to judge confidently of their appearance when interwoven.

To overcome this difficulty I prepare a sheet of cloth, A, of the desired ground color of the goods, and punch through the same a series of holes of different and successively decreasing or increasing sizes, $b\ c\ d\ e$, &c.

In the drawings are shown a row of eight horizontal holes, on each side of and diminishing in size from the vertical center line of the sheet A, and two vertical rows of eight holes each, and two pairs of horizontal side rows of four holes each.

By observation of samples of various colors through these holes, I am enabled to select and arrange as many as eight combinations of four colors each, or four combinations of eight colors each, besides combinations of more or less number.

B C D are different samples of colored goods of various shades, distinguishable by numbers marked on them or otherwise.

In getting up combinations of colors to suit a given background (represented by the color of the sheet A) a series of selected samples, B C D, are placed under a series of holes, $b\ c\ d$, one sample under each hole, in order to observe their effect in contrast with the color of the background, and to replace one or more of them by others when not found satisfactory. By shifting them for being viewed through holes of different sizes, the most suitable proportional amount of area of the different colors may also be ascertained.

Having thus described my invention, I claim as new and desire to secure by Letters Patent—

The mode of making up combinations of colors for patterns of woven and printed goods, which consists in arranging for selection differently-colored samples for observation through the holes of a perforated sheet of the given ground color, substantially as described.

ANDREW ZERBAN.

Witnesses:
C. SEDGWICK,
J. H. SCARBOROUGH.